Patented Jan. 31, 1939

2,145,749

UNITED STATES PATENT OFFICE

2,145,749

SODIUM SESQUISILICATE AND MIXTURES INCLUDING THE SAME AND METHOD OF MANUFACTURING

Chester L. Baker, Berkeley, Calif., assignor to Philadelphia Quartz Company, Philadelphia, Pa., a corporation of Pennsylvania No Drawing. Application November 12, 1934, Serial No. 752,697

13 Claims. (Cl. 23—110)

The present invention relates to sodium sesquisilicate and to compositions of matter which include such material as well as to methods of manufacturing the same.

Before stating the objects of the invention it should be pointed out that the name, "sodium sesquisilicate", as used herein refers to any one of a number of crystalline salts which are characterized by the fact that they contain one and one-half molecules of $Na_2O$ for each molecule of $SiO_2$.

The principal objects of the invention are to produce sodium sesquisilicate which is sufficiently free of residual mother liquor to permit grinding of the product into a stable, dry, free-flowing, granular condition; the production of mixtures of salts which include sodium sesquisilicate and which are also stable, dry and free-flowing in granular condition; the production of materials of the character mentioned in which the crystals are of microscopic size and so firmly meshed together that there are, apparently, no natural spaces between them; and the provision of methods for manufacturing the said products by means of which they can be crystallized en masse from the solutions from which they are prepared, i. e., a method in which the entire solution is converted into a crystal mass so that it is unnecessary to separate crystals from residual mother liquor as has been necessary with previously known methods such, for example, as that disclosed in United States Patent No. 1,948,730 to George W. Morey issued on February 27, 1934.

In considering the following description it should be borne in mind that there are fairly definite transition points between the several hydrates of sodium sesquisilicate, and in order to produce a satisfactory product in accordance with the objects of the present invention it is necessary to proceed in such a way as to avoid transition from one hydrate into another by proper control of the temperature. For example, the difficulty can be illustrated in the following way. If one takes a solution of silicate of soda and caustic soda in the proportions required to give a solution having three molecules of $Na_2O$ for each two molecules of $SiO_2$ and then boils the solution in order to evaporate the excess water so that the solution will have a chemical composition corresponding to that of the formula $Na_3HSiO_4.5H_2O$, he will observe that, after a time, the solution will become milky in appearance due to the separation of a fine crystalline material. If, after enough water has been evaporated so that the chemical composition of the mass as a whole is that of the product desired, an attempt is made to harden it by cooling, seeding and stirring, the resulting product will be soft like fudge candy and entirely unsuited to commercial use. Now I have found that the transition point between sodium sesquisilicate pentahydrate and sodium sesquisilicate dihydrate is below 100° C. and probably in the neighborhood of 80° C. It would appear then that the reason for the above result is to be found in the fact that the transition point between the two hydrates is exceeded when the solution is heated to the boiling temperature, so that the resulting mass crystallizes the dihydrate instead of the pentahydrate desired, leaving the excess of water present in the mass as a solution. A soft mass of the character obtained cannot be ground to a dry free-flowing condition nor is it stable in storage.

I have discovered on the other hand that one can avoid the above difficulty if he first prepares a solution which carries somewhat less $Na_2O$ than is desired in the product and then evaporates the required amount of water and cools to a temperature below the transition point between sodium sesquisilicate pentahydrate and sodium sesquisilicate dihydrate and then dissolves in the required amount of $Na_2O$ either as a concentrated aqueous solution or as solid caustic soda. In this way a final solution is obtained which may be crystallized into a hard brittle cake which can be easily ground to a stable free-flowing granular condition.

There is, of course, considerable variation permissible in the technique and without limiting myself to any specific procedure I will now give some preferred examples of the way in which my invention can be carried out, it being understood that the basis of the technique is to work under conditions where the desired compound is produced which, of course, involves avoidance of temperatures and conditions under which transition to undesired compounds may occur.

*Example for the preparation of $Na_3HSiO_4.5H_2O$ crystallized en masse*

To 1000 parts by weight of a solution of silicate of soda containing 8.9% $Na_2O$ and 28.5% $SiO_2$ are added 271 parts of caustic soda containing 76% $Na_2O$. The solution is then evaporated until the total weight is reduced from 1271 parts to 1016 parts. The hot liquor should test just under 63° Baumé and will have a chemical composition corresponding to the formula $$Na_2SiO_3.5H_2O$$

This solution is then cooled below 80° C. and preferably to about 65° C. and 205 parts of caustic soda containing 76% Na2O is stirred in. This weight of caustic soda provides one molecular equivalent of NaOH for each molecular equivalent of Na2SiO3.5H2O present in the solution, and permits the following chemical reaction:

$$Na_2SiO_3.5H_2O + NaOH \rightarrow Na_3HSiO_4.5H_2O$$

In some cases the caustic will need to be added a little at a time followed by cooling of the solution to insure that the temperature does not go too high. Good results may be secured if the temperature is maintained below 80° C. When all of the caustic has been dissolved, 50 parts of crystalline Na3HSiO4.5H2O may be added if required, and the mass cooled and stirred. As crystallization proceeds, the mass will become white and opaque in color and much thicker in consistency. At this stage it is run into pans. Upon cooling it will be found to be hard and brittle and may be ground to a free flowing granular condition.

This same product, namely, sodium sesquisilicate pentahydrate, may also be prepared in the following manner:

*Method of producing Na3HSiO4.5H2O*

To 3300 grams of a solution of silicate of soda containing 8.84% Na2O and 28.8% SiO2 is added 909 grams of caustic soda containing 76% Na2O and the solution thus formed evaporated to a weight of 3360 grams. The hot solution should then test just under 63° Baumé. This solution is then cooled to a temperature of 80° C. or below and 640 grams of caustic soda containing 76% Na2O dissolved in it. The mass is then placed on the two primary rolls of an ink grinding roll mill and ground for one minute. Five hundred grams of crystalline Na3HSiO4.5H2O may be ground into the mass on the mill if required. The third roll of the mill is then moved into place and the mass discharged onto the knife of the machine. The discharged mass will be white and opaque in color and will almost immediately harden into a brittle mass capable of being ground to a dry, free-flowing, stable, granular powder. More often, however, the mass will be discharged from the machine as thin white flakes which immediately harden and can be used in the arts without further grinding.

In the foregoing example the seeding by the addition of the 500 grams of crystalline $$Na_3HSiO_4.5H_2O$$

may not be necessary because experience has shown that after a period of cooling a number of crystals may sometimes form spontaneously and these can be satisfactorily dispersed by the grinding operation or its equivalent.

I have also discovered that it is possible to prepare extremely intimate mixtures of sodium sesquisilicate with other substances such, for example, as caustic soda, alkali metal carbonate, trisodium phosphate or soap. Mixtures of this kind are useful as detergents in various industrial operations but it is obvious, of course, that mixtures having other characteristics might be prepared and that the possible number thereof is very great with the conditions for producing them being dependent upon the individual peculiarities of the additional substance chosen as well as its possible reactions with sodium sesquisilicate.

Therefore, without limiting myself to any particular mixtures, the following examples are given by way of illustration.

*Example for the preparation of a mixture of Na3HSiO4.5H2O and Na3PO4.12H2O*

To 1000 parts by weight of a solution of silicate of soda containing 8.9% Na2O and 28.5% SiO2 are added 271 parts of caustic soda containing 76% Na2O. The solution is then evaporated until the total weight is reduced from 1271 parts to 1016 parts. The hot liquor should test just under 63° Baumé and will have a chemical composition corresponding to the formula Na2SiO3.5H2O. This solution is then cooled to about 50° C. and 205 parts of caustic soda containing 76% Na2O is stirred in. In some cases the caustic will need to be added a little at a time followed by cooling of the solution to insure that the temperature does not go above the melting point of $$Na_3PO_4.12H_2O$$

or 77° C. When all of the caustic has been dissolved, the solution will have a chemical composition corresponding to the formula $$Na_3HSiO_4.5H_2O.$$

Two hundred parts of trisodium phosphate (Na3PO4.12H2O) are then stirred in, and the mass cooled and stirred. As crystallization proceeds, the mass will become white and opaque in color and much thicker in consistency. At this stage it is run into pans. Upon cooling the mass will comprise an intimately crystallized mixture of Na3HSiO4.5H2O and Na3PO4.12H2O and will be hard and brittle so that it may be ground to a free-flowing granular condition.

*Example for the preparation of a mixture of NaOH.H2O and Na3HSiO4.5H2O*

To 6910 gm. of a solution of silicate of soda containing 28% SiO2 and 8.9% Na2O is added 1785 gm. of caustic soda and the solution thus formed evaporated to a weight of 7420 gm. The solution is then cooled to a temperature below 50° C. and preferably below 35° C. and 2580 gr. of NaOH added as fast as is possible without raising the temperature of the mass above 50° C. and preferably not above 35° C. As considerable heat is given off in this last operation, I have found it helpful to carry it out under agitation in equipment the walls of which are cooled by refrigerating brine or other means. (If the temperature is allowed to go too high the mass will crystallize substantially completely but will be rather soft in consistency and not hard and brittle as it should be.) The agitation may be carried out in a jacketed mixer, on chilled rolls or in any equipment that effects the desired mixing and temperature control. Mixing is continued until the mass has become quite thick. It is then run into thin pans or other receptacles designed to quickly dissipate the heat given off by crystallization. Upon cooling the mass will comprise an intimately crystallized mixture of Na3HSiO4.5H2O and NaOH.H2O. It will be hard and brittle in character and can be ground to a granular free-flowing condition.

In connection with the above example I have found that the desired crystalline compounds are in equilibrium with each other and their solution at 31° C. but not at 50° C. Apparently a ternary transition point exists at some temperature between 31° C. and 50° C. so that, if the prepared solution is crystallized at a lower temperature, the desired compounds are formed and the product is hard and dry in character, but if crystallization is carried out at a higher temperature some lower hydrate is formed (presumably Na₃HSiO₄.2H₂O) and the product is soft and moist. In practice I have found that a satisfactory product may be obtained if the temperature of the mass is maintained below 35° C., although good results might be obtained at higher temperatures approaching 50° C.

*Method of preparing a mixture of crystalline NaOH.H₂O and Na₃HSiO₄.2H₂O*

1450 grams of caustic soda containing 76% Na₂O are dissolved in 5250 grams of a solution of silicate of soda containing 28.84% SiO₂ and 8.84% Na₂O.

The solution thus formed is evaporated to a weight of 5476 grams and is then cooled to any convenient temperature below the melting point of the desired NaOH.H₂O, namely, 67° C. 4555 grams of caustic soda containing 76% Na₂O are then added and the mixture ground for one minute on the two primary rolls of an ink grinding roll mill. The third roll is then brought into position and the mass discharged from the machine as a thick, white, opaque paste which hardens within a short period of time into a brittle mass which can be easily ground to a granular or powdery free-flowing, stable product. The product comprises an intimately crystallized mixture of Na₃HSiO₄.2H₂O and NaOH.H₂O.

The products of all of the foregoing examples are stable in character and, as indicated, can be ground to dry, free-flowing, granular or powdered condition as may be desired. The individual crystals are microscopic in size and so firmly meshed together that there are apparently no natural spaces between them. The difference can be readily observed under the microscope and is easily apparent to even the uninitiated layman. It may be likened to that which exists between limestone and calcite crystals or between candy and granulated sugar, the products of the prior art, such, for example, as that which is produced by the method of the above mentioned Morey patent, being comparatively coarse in size and texture and corresponding to the calcite crystals and the granulated sugar in the comparison just made.

Furthermore, my improved method makes it unnecessary to subsequently separate the crystals from the residual mother liquor. When this is done the crystals must be dried and the process as a whole includes many practical difficulties involving considerable expense which are completely overcome by my improvements.

I claim:—

1. In the preparation of definite crystalline hydrates of sodium sesquisilicate containing at least two molecules of water from silicate solutions containing more water and less Na₂O than the desired sesquisilicate, the process which comprises adding sufficient caustic soda to such a solution to produce a molar ratio of not substantially more than 1Na₂O to 1SiO₂ and evaporating said solution by heating to remove excess water, cooling said solution to lower temperatures below 100° C. and below the temperature of the transition point between the desired hydrate and that of the hydrate of next higher melting point; adding sufficient caustic soda at said lower temperatures to produce a molar ratio of 1½Na₂O to 1SiO₂, then cooling and crystallizing the solution as a whole without exceeding said temperatures, thereby producing a hard and brittle product capable of being ground to a free-flowing, granular condition; the water content of said solution being adjusted to that of the desired hydrate prior to the said crystallizing step.

2. In the preparation of sodium sesquisilicate pentahydrate from silica solutions containing more water and less Na₂O than the desired pentahydrate, the process which comprises adding caustic soda to such a solution in amount sufficient to produce a molar ratio of not substantially more than 1Na₂O to 1SiO₂, evaporating excess water from said solution by heating, then cooling said solution at low temperatures below 100° C. and below temperatures producing a precipitate of sodium sesquisilicate dihydrate upon the addition of caustic to said solution, adding sufficient caustic soda at said low temperatures to produce a molar ratio of 1½Na₂O to 1SiO₂ then cooling and crystallizing said solution as a whole without exceeding said low temperatures, thereby producing a hard and brittle sodium sesquisilicate pentahydrate capable of being ground to a free-flowing, granular condition; the water content of said solution being adjusted to that of the desired hydrate prior to the said crystallizing step.

3. The process of claim 2 wherein the commercial solution is causticized to produce a molar ratio of substantially 1Na₂O to 1SiO₂ and is then evaporated to a density of substantially 63° Bé. prior to the cooling step.

4. The process of claim 2 wherein the commercial solution is causticized to produce a molar ratio of substantially 1Na₂O to 1SiO₂ and is then evaporated until its composition corresponds substantially to Na₂SiO₃.5H₂O prior to the cooling step.

5. In the preparation of sodium sesquisilicate pentahydrate from silicate solutions containing more water and less Na₂O than the desired pentahydrate, the process which comprises adding caustic soda and evaporating such a solution to produce a composition corresponding substantially to Na₂SiO₃.5H₂O, cooling said solution below 100° C. and below the transition point between sodium sesquisilicate dihydrate and the pentahydrate, then adding sufficient caustic soda to produce a composition corresponding substantially to Na₃HSiO₄.5H₂O, cooling, adding seed crystals and crystallizing said solution as a whole, thereby producing the desired hydrate in a hard and brittle state capable of being ground to a free-flowing, granular condition.

6. In the preparation of definite crystalline hydrates of sodium sesquisilicate from silicate solutions containing more water and less Na₂O than is required to produce the final hydrate product, the process which comprises evaporating excess water from such a silicate solution by heating it; the Na₂O present during said heating step being not substantially more than that corresponding to a molar ratio of 1Na₂O to 1SiO₂; cooling the resulting solution to lower temperatures below its boiling point and below temperatures at which any extraneous hydrate is precipitated upon the addition of caustic soda, then adding caustic soda at said lower temperatures sufficient to produce a molar ratio of substantially 1½Na₂O to 1SiO₂ and crystallizing the solution as a whole without exceeding said lower temperatures, thereby producing a hard and brittle product capable of being ground to a free-flowing, granular condition; the water content of said solution being adjusted to that of the final hydrate product prior to the said crystallizing step.

7. The process of claim 6 wherein the silicate solution to be evaporated is causticized by the addition of caustic soda prior to the evaporation step to produce a molar ratio of substantially $1Na_2O$ to $1SiO_2$.

8. The process of claim 6 wherein the hydrate product obtained is $Na_3HSiO_4.5H_2O$.

9. The process of claim 6 wherein the hydrate product obtained is $Na_3HSiO_4.2H_2O$.

10. In the preparation of compositions of matter containing sodium sesquisilicate hydrates and other crystalline hydrates in admixture from silicate solutions containing more water and less $Na_2O$ than the desired sesquisilicate, the process which comprises evaporating excess water from such a silicate solution by heating it; the $Na_2O$ present during said heating step being not substantially more than that corresponding to a molar ratio of $1Na_2O$ to $1SiO_2$; cooling the resulting solution to temperatures below 100° C. and below temperatures at which any extraneous hydrate is precipitated upon the addition of caustic soda, adding caustic soda at these lower temperatures sufficient to produce a molar ratio of substantially $1½Na_2O$ to $1SiO_2$, adding the hydrate of a compatible alkali metal compound, then cooling and crystallizing the solution as a whole without exceeding the melting point of the added alkali metal compound, thereby producing a product in a hard and brittle state capable of being ground to a free-flowing, granular condition; the water content of said solution being adjusted to that desired in the final product prior to the crystallizing step.

11. The process of claim 10 wherein the added hydrate is $Na_3PO_4.12H_2O$ and the sesquisilicate hydrate is $Na_3HSiO_4.5H_2O$.

12. The process of claim 10 wherein the added hydrate is $NaOH.H_2O$, the sesquisilicate hydrate is $Na_3HSiO_4.5H_2O$ and the temperature is maintained below about 50° C. after the cooling step.

13. The process of claim 10 wherein the added hydrate is $NaOH.H_2O$ and the sesquisilicate hydrate is $Na_3HSiO_4.2H_2O$.

CHESTER L. BAKER.